United States Patent
Brand et al.

(10) Patent No.: US 8,504,475 B2
(45) Date of Patent: Aug. 6, 2013

(54) SYSTEMS AND METHODS FOR ENROLLING USERS IN A PAYMENT SERVICE

(75) Inventors: Olivier Brand, Walnut Creek, CA (US); Gregory Trifiletti, Saratoga, CA (US); Mike Lindelsee, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 194 days.

(21) Appl. No.: 12/853,101

(22) Filed: Aug. 9, 2010

(65) Prior Publication Data

US 2011/0035319 A1    Feb. 10, 2011

Related U.S. Application Data

(60) Provisional application No. 61/232,695, filed on Aug. 10, 2009.

(51) Int. Cl.
*G06Q 20/10* (2012.01)

(52) U.S. Cl.
USPC .............................. 705/39; 705/35; 705/38

(58) Field of Classification Search
USPC ........................................ 705/35, 38, 40, 39
See application file for complete search history.

(56) References Cited

U.S. PATENT DOCUMENTS

| | | | |
|---|---|---|---|
| 6,227,447 B1 | 5/2001 | Campisano | |
| 6,341,724 B2 | 1/2002 | Campisano | |
| 7,103,576 B2 | 9/2006 | Mann, III et al. | |
| 2005/0131816 A1 * | 6/2005 | Britto et al. ..................... | 705/39 |
| 2009/0037982 A1 | 2/2009 | Wentker et al. | |
| 2011/0055077 A1 * | 3/2011 | French et al. .................. | 705/39 |
| 2011/0218871 A1 * | 9/2011 | Singh .............................. | 705/17 |
| 2012/0016799 A1 * | 1/2012 | Killian et al. ................... | 705/44 |

FOREIGN PATENT DOCUMENTS

| | | |
|---|---|---|
| KR | 10-2001-0044265 A | 6/2001 |
| KR | 10-2008-0081240 A | 9/2008 |
| WO | 2008/042792 A1 | 4/2008 |

OTHER PUBLICATIONS

International Search Report and Written Opinion Issued in PCT/US2010/044900 on Feb. 17, 2011, 9 pages.

* cited by examiner

*Primary Examiner* — Jagdish Patel

(74) *Attorney, Agent, or Firm* — Kilpatrick Townsend & Stockton LLP

(57) ABSTRACT

Embodiments of the invention are direction to systems, apparatuses and methods for enrolling users in a payment service that enables an individual ("a presenter") to conduct a payment transaction with another party ("an acceptor") more efficiently in situations where the individual has multiple payment accounts. One embodiment of the invention is directed to a method comprising presenting to a user a plurality of payment accounts associated with the user, receiving from the user a selection of an alias account identifier for each of the payment accounts, and storing in a database data that associates the selected alias account identifiers with the payment accounts.

20 Claims, 11 Drawing Sheets

SYSTEMS AND METHODS FOR ENROLLING USERS IN A PAYMENT SERVICE

CROSS-REFERENCES TO RELATED APPLICATIONS

The present invention is a non-provisional application and claims priority to U.S. Provisional Application No. 61/232,695, filed on Aug. 10, 2009, the entire contents of which are herein incorporated by reference.

BACKGROUND

Many consumers have multiple payment accounts (e.g., multiple credit cards). For example, a consumer may have a payment account that the consumer uses to pay for household items and another payment that the consumer uses to pay for business expenses.

In some instances, upon initiating an online payment transaction, a consumer may be redirected to a website of the financial institution that administers the consumer's multiple payment accounts. This website may display the account numbers of the consumer's multiple payment accounts and prompt the consumer to select the account number that corresponds to payment account that the consumer wants to use for the online payment transaction. Accordingly, to select the appropriate payment account, the consumer has to be able to identify the account number of that payment account. To do so, the consumer may have to spend time reviewing the account numbers of the multiple payment accounts. Further, because it may be difficult to distinguish between the account numbers, the consumer may sometimes select the wrong payment account, even if the consumer spends time carefully reviewing the account numbers.

It would be desirable to provide systems and methods that enable consumers to conduct payment transactions more efficiently and effectively in situations where the consumer has multiple payment accounts.

Embodiments of the invention address these and other problems, individually and collectively.

BRIEF SUMMARY

Embodiments of the invention are direction to systems, apparatuses and methods that enroll users in a payment service that enables an individual ("a presenter") to conduct a payment transaction with another party ("an acceptor") more efficiently in situations where the individual has multiple payment accounts.

One embodiment of the invention is directed to a method comprising presenting to a user a plurality of payment accounts associated with the user, receiving from the user a selection of an alias account identifier for each of the payment accounts, and storing in a database data that associates the selected alias account identifiers with the payment accounts.

Another embodiment of the invention is directed to a method comprising receiving a request to enroll a user in a payment service, wherein at least one user identifier is associated with the user, verifying that the at least one user identifier is unique across a plurality of issuers, redirecting the user to at least one of the issuers, wherein the at least one issuer enables the user to assign an alias account identifier to at least one payment account that is associated with the user and that is held by the at least one issuer, receiving from the at least one issuer data that identifies the at least one payment account and the alias account identifier that the user assigned to the payment account, and storing in a database data that identifies the at least one payment account and the alias account identifier that the user assigned to the payment account.

One embodiment of the invention is directed to a system comprising a database and a server in communication with the database. The server comprises a processor and computer readable medium coupled to the processor. The computer readable medium comprises computer readable program code embodied therein. The computer readable program code adapted to be executed by the processor to present to a user a plurality of payment accounts associated with the user, receive from the user a selection of an alias account identifier for each of the payment accounts, and store in the database data that associates the selected alias account identifiers with the payment accounts.

Other embodiments of the invention are directed to computer readable media comprising code for performing the above-described methods as well as systems, apparatuses and devices that perform the methods and/or that use the computer readable media.

These and other embodiments are described in further detail below.

DETAILED DESCRIPTION

Figure 1:
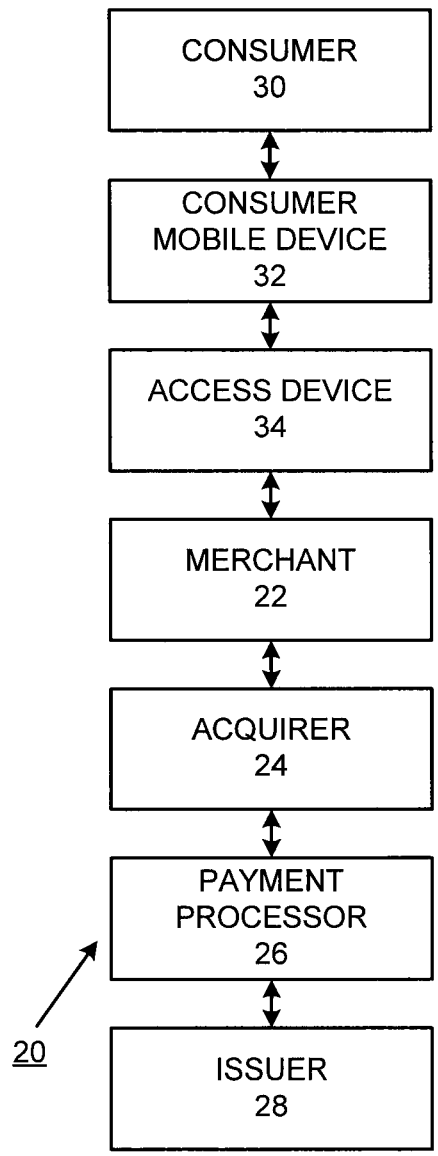
FIG. 1 shows a block diagram illustrating aspects of an exemplary system, in accordance with at least one embodiment.

Embodiments are directed to a system, and associated apparatuses and methods for enrolling individuals in a payment service that enables an individual ("a presenter") to conduct a payment transaction with another party ("an acceptor") more efficiently in situations where the individual has multiple payment accounts. A consumer or user may be an example of a presenter. The acceptor can be a merchant, a service provider, or any other entity that my engage in a payment transaction with a presenter. Further, embodiments are directed to systems, apparatuses, and methods for using the payment service to initiate a transaction, using the payment service to select a payment account for the transaction, and using the payment service to authenticate a transaction involving the selected payment account, where payment service may be implemented using one of multiple possible communications channels (e.g., web, SMS, mobile web, IVR).

As general overview, in some embodiments, a system architecture is provided that allows a consumer to register multiple payment accounts (such as multiple credit- or debit-card accounts) with a centralized authority (such as a payment processor), and then assign a nickname or alias account identifier to each account. During a payment transaction, the consumer may provide a phone number or other "user identifier" that is provided to the payment processor. The payment processor uses the user identifier to access a list of previously registered payment accounts for the consumer. The consumer is then presented with a list of possible payment accounts that are registered to the consumer, with each account identified by its nickname or alias account identifier. After the consumer selects the desired account to be used for the transaction, the payment processor sends information about the consumer, the selected payment account, and the transaction to the appropriate issuer in order to conduct the payment transaction. The initial enrollment process, where the consumer sets up a mobile payment process and assigns a nickname or alias account identifier to each registered payment account may include providing the payment authority with user identifier to access a list of the available accounts. When the consumer wants to conduct a transaction, the consumer may be asked to provide the consumer's user identifier in order to be presented with a list of potential payment accounts that may be used for the transaction.

Among other benefits, embodiments of the present invention provide consumers with a tool that enables more efficient and accurate use of multiple payment accounts. Known systems may be inefficient and may cause consumers to mistakenly use the wrong payment account for a payment transaction. For example, when a consumer having multiple payment accounts initiates a transaction, some known systems display the account numbers of the consumer's multiple payment accounts and then prompt the consumer to select the account number that corresponds to payment account that the consumer wants to use for the transaction. To select the appropriate payment account, the consumer has to be able to identify the account number of that payment account. To do so, the consumer may have to spend time reviewing the account numbers of the multiple payment accounts. Further, because it may be difficult to distinguish between the account numbers, the consumer may sometimes select the wrong payment account, even if the consumer spends time carefully reviewing the account numbers.

In contrast, embodiments of the present invention display a nickname or alias that the consumer assigned to each of the multiple payment accounts and then prompt the consumer to select the nickname or alias that corresponds to the payment account that the consumer wants to use for the transaction. In part because the consumer selected the nicknames or aliases and in part because nicknames and aliases are easier to recognize than account numbers, the consumer is likely able to quickly and accurately identify and select the nickname associated with the account the consumer wants to use for the transaction. This saves the consumer the time of having to review the payment account numbers and reduces the possibility of the consumer selecting the wrong payment account.

Further, this enables consumers to efficiently and accurately manage a greater number of payment accounts, enables consumers to personalize the nicknames or aliases of the payment accounts, and may be used to identify a market segment or provide another form of market differentiation. Embodiments of the present invention may also increase the types of payment or identification products that are available, as well as increase the adoption of such products.

According to a first embodiment, a method for enrolling consumers in the payment service comprises presenting to a consumer a plurality of payment accounts that are associated with the consumer. The payment accounts may be the consumer's payment accounts that are held by one or more issuers, such as banks and other financial institutions. For example, if a consumer has a first payment account at a first issuer and a second payment account at a second issuer, embodiments, present the consumer with the first and second payment accounts.

After presenting the payment accounts, embodiments receive from the consumer a selection of an alias account identifier for each of the payment accounts. For example, an alias account identifier may be a nickname that the consumer wishes to assign to a payment account, such that the consumer can easily identify the account. Referring to the example above where the consumer has a first payment account at a first issuer and a second payment account at a second issuer, the consumer may assign an alias account identifier of "Blue Card" for the first account at the first issuer and the consumer may assign an alias account identifier of "Red Card" for the second account at the second issuer. It should be appreciated that consumers may create and assign custom alias account identifiers to their payment accounts. For example, a consumer may assign an alias account identifier of "Household" for the payment account that consumer uses to pay for household items and services, such as groceries. Further, for example, a consumer may assign an alias account identifier of "Entertainment" for the payment account that consumer uses to pay for entertainment items and services, such as dinning at restaurants.

Next, embodiments present to the consumer a number of authentication channels from which the consumer may choose to authenticate transactions involving the payment accounts. For example, the consumer may be presented with the option of authenticating by web, SMS, mobile web, IVR. The consumer may select an authentication channel for each payment account. Accordingly, the consumer may choose to authenticate some payment accounts using a particular authentication channel, and the consumer may choose to authenticate other payment accounts using a different authentication channel or channels.

After receiving the selected alias account identifiers and the authentication channels from the consumer, embodiments store in a database information that associates the selected alias account identifiers and authentication channels with the payment accounts. For example, embodiments may store a list of the consumer's payment accounts, where, for each payment account, the list includes the selected alias account identifier and authentication channel.

According to a second embodiment, a method for enrolling consumers in the payment service comprises receiving a request to enroll a consumer in the payment service. For example, the method may be implemented by a payment processor and the request may be sent to the payment processor from the consumer or from one or more issuers on behalf of the consumer. According to this embodiment, the request includes a consumer identifier that is associated with the consumer. The consumer identifier may be, for example, a mobile telephone number associated with the consumer's mobile device. After receiving the request, embodiments verify that the consumer identifier is unique across multiple issuers. For example, embodiments verify that, to the extent multiple issuers have a record of the consumer identifier, the records of those issuers indicate that the consumer identifier is associated with the consumer being enrolled. If an issuer has a record that indicates the consumer identifier is associated with a different consumer, then the consumer identifier is not unique across multiple issuers.

After verifying the consumer identifier, embodiments redirect the consumer to the one or more issuers that hold the consumer's payment accounts. Each issuer enables the consumer to select an alias account identifier for each payment account associated with the consumer and held by the issuer. Next, embodiments receive from each issuer data that identifies the payment accounts and the alias account identifiers that the consumer assigned to each payment account.

In addition to enabling the consumer to select alias account identifiers, the issuer presents to the consumer a number of authentication channels and enables the consumer to select which authentication channels the consumer would like to use to authenticate transactions involving the various payment accounts. According to some embodiments, the consumer may select an authentication channel for each payment account. However, according to other embodiments, the consumer selects an authentication channel for all payment accounts.

After receiving the selected alias account identifiers and authentication channels from each issuer, embodiments store in a database information that associates the selected alias account identifiers and authentication channels with the payment accounts, even if the payment accounts are held by different issuers. Accordingly, if the consumer has payment accounts at multiple issuers, the database includes the consumer's alias account identifiers and authentication channel selections for the consumer's payment accounts across multiple issuers.

According to other embodiments, a method for using the payment service to initiate a transaction and select a payment account for the transaction comprises receiving a request to initiate a payment transaction involving the consumer. For example, the request may be sent by a merchant attempting to conduct a transaction with the consumer. Also, for example, the request may be sent by an issuer, which received a request from a merchant attempting to conduct a transaction with the consumer. In response to receiving the request, embodiments provide the consumer with a list of all of the consumer's alias account identifiers. Each of the alias account identifiers corresponds to one of the payment accounts associated with the consumer. The payment accounts may be held by different issuers. Next, embodiment receive the consumer's selection of one of the alias account identifiers. Embodiments then request authentication of identity of the consumer and validation of the selected payment account.

According to other embodiments, methods and systems are provided for authenticating the identity and validating the profile data of the consumer who is presenting himself or herself to the merchant as having a certain identity and having certain corresponding profile data.

Other specific examples of embodiments of the invention are described in further detail below. The following acronyms are used in some instances:

ACS: The Access Control Server gives issuers the ability to authenticate cardholders during an online purchase, thereby reducing the likelihood of fraudulent use of payment accounts.

IVR: Interactive Voice Response is a phone technology that allows a computer to detect voice and touch tones via a normal phone call.

SMS: Short Message Service involves messages being sent to and from mobile phones. SMS messages can allow users to send up to 160 characters per message.

MPI: The Merchant Plug-in is a component that operates in the Acquirer Domain. In the online environment, it performs functions related to 3-D Secure on behalf of the merchant. Functions include determining whether authentication is available for a card number, and validating the digital signature in a 3-D Secure message.

MSISDN: Mobile Subscriber ISDN Number. This is the consumer's telephone number.

USSD: Unstructured Supplementary Service Data is a capability built into the GSM standard for support of transmitting information over the signalling channels of the GSM network. USSD provides session-based communication, enabling a variety of applications.

VbV: Verified by Visa was introduced in order to reduce fraud and shift liability. VbV allows banks to authenticate consumers for remote payments using a standards based approach.

Mobile Web: Mobile Web browsers provide all of the basic services of a PC based web browser, but simplified to operate within the restrictions of a mobile phone.

Alias Account Identifier: An alias account identifier is a representation of a payment account number. It could be a masked payment account number or any other textual representation the issuer decides to choose.

Eligible Alias Account Identifier: Alias Account Identifiers returned to the consumer from the merchant. The specific Alias Account Identifier can be used by the consumer based on the initiation channel that was used as well as the authentication channels supported by the issuer the Alias Account Identifier is associated with.

Authentication Channel: Channel selected by the consumer during issuer enrollment and presented during shopping in the merchant CPN selection process.

User Identifier: a unique name a consumer uses during the enrollment process and payment process. Uniqueness of User Identifiers is handled by the payment processor across consumers and issuers.

Consumer Mobile Device: The device used by a consumer to initiate and authenticate a payment transaction. The Consumer Mobile Device relies on thin or thick clients to interact with the services provided by the payment processor.

Embodiments of the present invention are typically implemented in the context of a payment transaction. In a typical payment transaction, a consumer provides a user identifier to a merchant or service provider. The user identifier may be provided by the consumer in a card-not-present situation (e.g., over a network as in an eCommerce transaction). The user identifier may also be provided by a contactless element such as a chip embedded in a mobile phone, PDA, or other device that can function to make a payment for a transaction.

To provide a context in which the present invention may be implemented, a brief discussion of the entities involved in processing and authorizing a payment transaction and their roles in the processing of payment transaction data, will be presented. FIG. 1 is a functional block diagram illustrating the primary functional elements of an exemplary system 20 for conducting an electronic payment transaction and processing payment transaction data that may be used in implementing an embodiment of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "acquirer" is typically a business entity (e.g., a commercial bank) that has a business relationship with a particular merchant. An "issuer" is typically a business entity (e.g., a bank or credit union) which issues a payment device such as a credit card, debit card, smart card, or contactless device to a consumer and which provides administrative and management functions for the consumer's payment accounts. Some entities may perform both issuer and acquirer functions.

As shown in FIG. 1, in a typical transaction, a consumer 30 wishing to purchase a good or service from a merchant provides transaction data that may be used as part of a transaction authorization process, typically by means of a consumer mobile device 32 that is capable of functioning as a payment device. In an eCommerce (electronic commerce) transaction, the consumer may enter data into a consumer device capable of communicating with a merchant or other element of system 20, such as a laptop or personal computer. The consumer may also initiate the transaction using data stored in and provided from a suitable form of data storage device (such as a smart card, mobile phone or PDA containing a contactless element, or a transportable memory device). As examples, a consumer may enter payment account data into a computing device as part of an eCommerce transaction. Further, a consumer may enter payment account data into a cell phone or other device capable of wireless communication (e.g., a laptop computer or personal digital assistant (PDA)) and have that data communicated by the device to the merchant, the merchant's data processing system, or a transaction authorization network. A wireless device may also be used to initiate a payment transaction by means of communication between a contactless element embedded within the device and a merchant device reader or point of sale terminal using a near field communications (NFC) or short range communications mechanism, such as RF, infra-red, optical, etc. Thus, in some cases an access device 34 may be used to read, scan, or otherwise interact with a consumer's portable payment device and thereby obtain data used in conducting a payment transaction.

The user identifier is provided from the consumer to the merchant 22 or to the merchant's data processing system. The merchant or merchant's data processing system generates a transaction authorization request message that may include data obtained from the consumer as well as other data related to the transaction and the merchant. As part of generating the authorization request message, the merchant 22 or the merchant's transaction data processing system may access a database which stores data regarding the consumer, the consumer's payment device, or the consumer's transaction history with the merchant. The merchant transaction data processing system typically communicates with a merchant acquirer 24 (e.g., a commercial bank which manages the merchant's accounts) as part of the overall transaction authorization process. The merchant's transaction data processing system and/or merchant acquirer 24 provide data to payment processor 26, which among other functions, participates in the clearance and settlement processes which are part of the overall transaction processing. As part of the transaction authorization process, an element of payment processor 26 may access an account database which contains information regarding the consumer's payment history, chargeback or dispute history, credit worthiness, etc. The payment processor 26 communicates with issuer 28 as part of the authorization process, where issuer 28 is the entity that issued the payment account to the consumer and provides administrative and management services for the consumer's payment account. Consumer account data is typically stored in a consumer database which is accessed by issuer 28 as part of the transaction authorization and account management processes.

In standard operation, an authorization request message is created during a consumer purchase (or proposed purchase) of a good or service at a point of sale (POS). The point of sale may be a virtual point of sale such as a web-site that is part of an eCommerce transaction. In a typical transaction, the authorization request message is sent from the point of sale (e.g., the merchant or the merchant's transaction data processing system) to the merchant's acquirer 24, then to the payment processor 26, and then to the appropriate issuer 28. An authorization request message can include a request for authorization to conduct an electronic payment transaction. It may include one or more of an account holder's primary account number, payment device expiration date, currency code, sale amount, merchant transaction stamp, acceptor city, acceptor state/country, etc. An authorization request message may be protected using a secure encryption method (e.g., 128-bit SSL or equivalent) in order to prevent data from being compromised.

The consumer mobile device 32 (an example of a payment device) may be in any suitable form that can function as a payment device or that may incorporate a contactless chip or other element to enable it to function as a payment device. For example, suitable consumer mobile devices can be cellular phones, personal digital assistants (PDAs), pagers, payment cards, security cards, access cards, smart media, transponders, and the like, where such devices may incorporate a contactless element. They may include contact or contactless smart cards, credit or debit cards (typically with a magnetic strip and without an embedded microprocessor), keychain devices (such as the Speedpass™ commercially available from Exxon-Mobil Corp.), and depending upon the specific device, may incorporate a contactless element that is configured to enable the consumer mobile device to function as a payment device. Other examples of suitable consumer mobile devices include hand-held and compact so that they can fit into a consumer's wallet and/or pocket (e.g., pocket-sized). Depending upon the specific design, the consumer mobile device may function as one or more of a debit device (e.g., a debit card), a credit device (e.g., a credit card), or a stored value device (e.g., a stored value or prepaid card).

The payment processor 26 may include data processing subsystems and networks, and be configured to implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for transactions.

The payment processor 26 may include a server computer. A server computer is typically a powerful computer or cluster of computers. For example, the server computer can be a large mainframe, a minicomputer cluster, or a group of servers functioning as a unit. In one example, a server computer may be a database server coupled to a Web server. The payment processor 26 may use any suitable wired or wireless network, including the Internet, to facilitate communications and data transfer between its component system elements.

Figure 2:
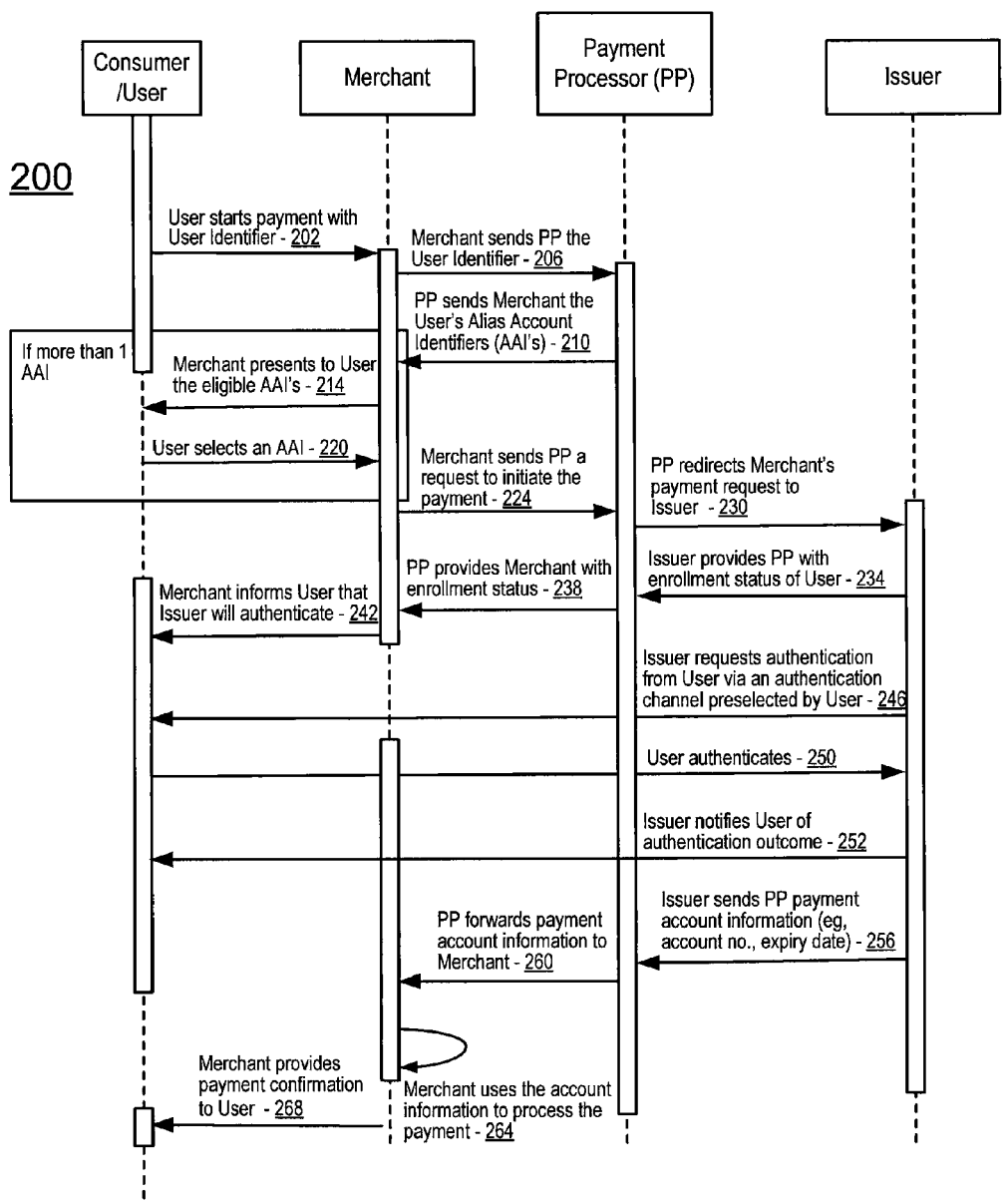
FIG. 2 shows a flowchart illustrating aspects of an exemplary initiation and authentication process, in accordance with at least one embodiment.

As mentioned above, embodiments are directed to systems and methods for enrolling consumers in a payment service that enables consumers to conduct payment transactions with merchants more efficiently in situations where the consumers have multiple payment accounts. However, before describing systems and methods for enrolling consumers in the payment service, embodiments of the payment service itself will now be described with reference to FIGS. 1 and 2. FIG. 2 is a flowchart illustrating a method for using the payment service to initiate a transaction, select a payment account for the transaction, and authenticate a transaction using the selected payment account.

As indicated a step 202, the consumer 30 initiates a payment by providing the consumer's user identifier to the merchant 22. Then, as indicated at step 206, the merchant 22 sends the user identifier to the payment processor 26, which assesses a consumer database and obtains alias account identifiers for the payments accounts that are associated with the user identifier. Alias account identifiers are nicknames consumers assign to their payment accounts during an enrollment process, which is described in detail below.

Next, as indicated at step 210, the payment processor 26 sends the alias account identifiers to the merchant 22. According to some embodiments, the merchant 22 then determines which of the payment accounts, as identified by the alias account identifiers, are compatible with the merchant's payment infrastructure and thereby eligible to be used in the transaction. Then, as indicated at step 214, the merchant 22 presents to the consumer 30 the alias account identifiers for the eligible payment accounts.

Upon receiving the list of eligible alias account identifiers, the consumer 30, as indicated at block 220, selects the alias account identifier for the payment account that the consumer 30 wants to use for the transaction. After receiving the selected alias account identifier, the merchant 22, as indicated at step 224, sends to the payment processor 26 a request to initiate a payment using the selected alias account identifier. Then, as indicated at step 230, the payment processor 26 redirects the merchant's payment request to the issuer 28 that manages the payment account associated with the selected alias account identifier. Next, as indicated at step 234, the issuer 28 provides the payment processor 26 with the enrollment status of the consumer 30. For example, the enrollment status indicates whether the consumer 30 is enrolled in the payment service and, if authentication is required, the authentication channel used for authentication. Further, for example, the enrollment status may indicate whether the selected payment account has sufficient funds or credit to conduct the transaction. If there are insufficient funds or credit in the consumer's account, then the payment transaction may not be authorized and the transaction may be terminated. Conversely, if there are sufficient funds or credit in the consumer's payment account, then the payment processor 26, as indicated at step 238, provides the merchant 22 with enrollment status, and then the merchant, as indicated at step 242, informs the consumer 30 that the issuer 28 will authenticate the identity of the consumer 30 before authorizing the transaction.

It should be appreciated that instead of or in addition to providing the enrollment status of the consumer 30, as indicated at step 234, the issuer 28 may provide the payment processor 26 with detailed payment account information, e.g., account number and expiration date, along with authorization to proceed with the transaction without authentication. In this case, the payment processor 26 would provide the merchant 22 with the necessary authorization and payment account information to execute the transaction, without the issuer first authenticating the identity of the consumer 30.

Referring now to step 246, the issuer 28 requests authentication from the consumer 30 via an authentication channel (e.g., web, SMS, mobile web, IVR) that is preselected by the consumer during an enrollment process, which is described in detail below. Then, as indicated at step 250, the consumer 30 authenticates and the issuer 28, as indicated at step 252, notifies the consumer 30 of the authentication outcome. If the authentication was successful, the issuer 28, as indicated at step 256, provides the payment processor 26 with detailed payment account information, e.g., account number and expiration date, and authorization to proceed with the transaction. Then, as indicated at step 260, the payment processor 26 provides the merchant 22 with the necessary authorization and payment account information to execute the transaction.

Next, as indicated at step 264, the merchant 22 uses the payment account information to execute the transaction and then, as indicated at step 268, provides the consumer 30 with transaction confirmation.

Figure 3:
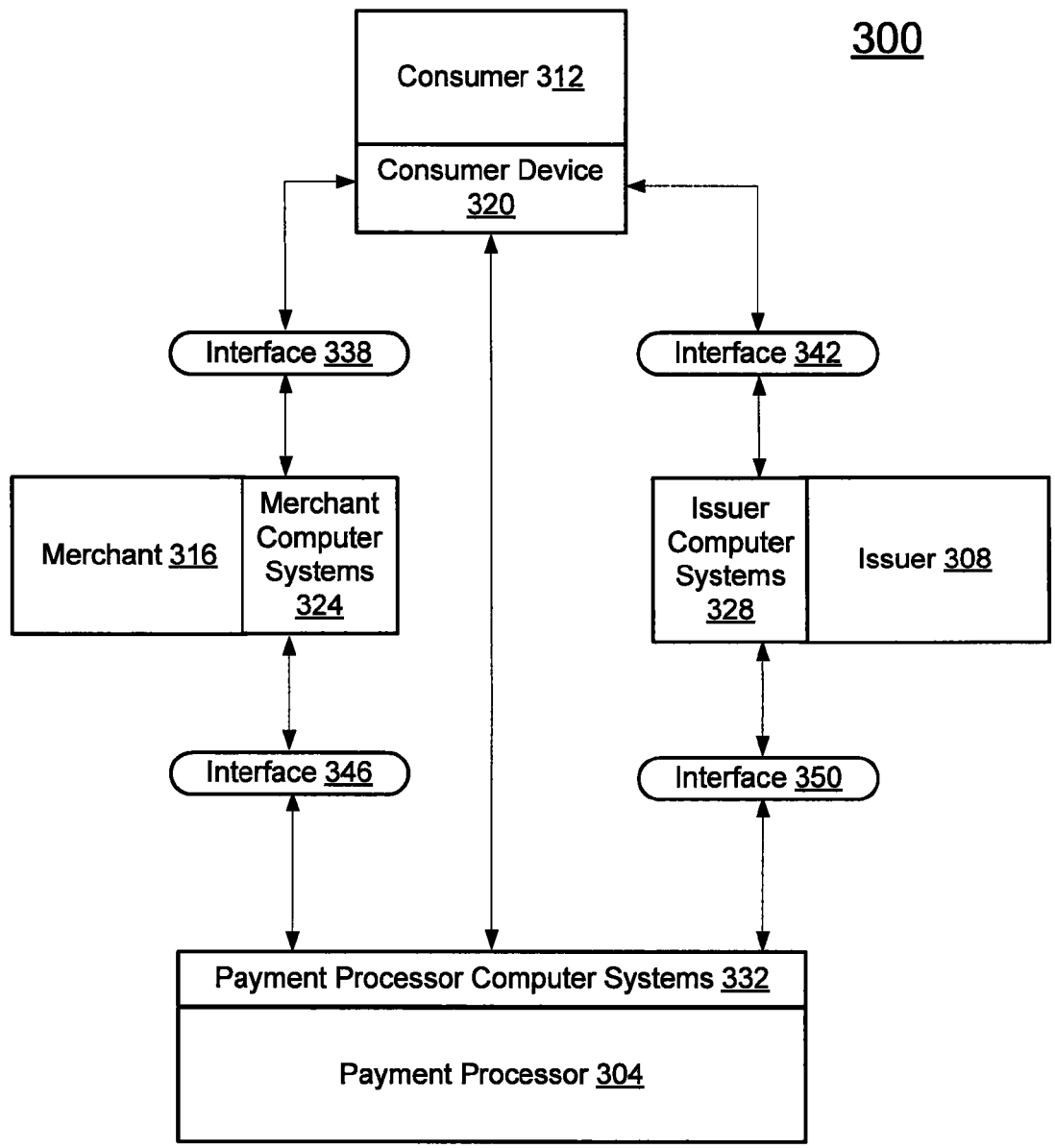
FIG. 3 shows a block diagram illustrating aspects of an exemplary system, in accordance with at least one embodiment.

Referring now to FIG. 3, another functional block diagram is provided that illustrates the primary functional elements of another exemplary system 300 capable of implementing the process 200 described in FIG. 2 as well as the enrollment processes described below with reference to FIGS. 4a-b and 5-7. The system 300 includes a payment processor 304, an issuer 308, a consumer 312, and a merchant 316. Although one payment processor 304, one issuer 308, one consumer 312, and one merchant 316 are illustrated in FIG. 3, there may be any suitable number of any of these entities in the system 300.

A consumer device 320 is associated with the with consumer 312 and, according to some embodiments, provides an entry point to checkout processes offered by the merchant 316, authentication processes provided by the issuer 308, and payment service processes provided by the payment processor 304. According to some embodiments, the consumer device 320 may be a mobile phone similar to the one described in FIG. 10. Further, according to some embodiments, the consumer device 320 may be a personal computer or a laptop. Also, according to some embodiments, the consumer device 320 can host either a thin or thick remote client. For example, a thin client is realized via Web, Mobile Web, SMS, and IVR, whereas a thick client is realized via an application residing on the consumer device 320 itself. In operation, according to some embodiments described in more detail below, the consumer device 320 initiates the payment process, inputs the user identifier of the consumer 312, optionally selects the alias account identifier of the payment account selected by the consumer 312, transmits authentication data, and outputs the payment outcome.

The merchant 316 may own or operate merchant computer systems 324. According to some embodiments, the merchant computer systems 324 include a merchant plug-in (MPI), which serves as an interface between the consumer device 320 and the payment processor 304. The responsibility of the MPI 324 is to display to the consumer 312 via the consumer device 320 a list of alias account identifiers for eligible payment accounts. The MPI 324 also captures the alias account identifier that the consumer 312 selects for the transaction. Further, the MPI 324 passes from the consumer device 320 to the payment processor 304 the alias account identifier of the payment account selected by the consumer 312. The MPI 324 also requests from the payment processor 304 the authentication outcome. If the transaction is authenticated, the MPI 324 triggers the payment authorization.

The issuer 308 may own or operate issuer computer systems 328. According to some embodiments, the issuer computer systems 328 include an access control server (ACS), which is a computer apparatus that serves as the interface between the consumer device 320 and the payment processor 304. According to some embodiments, the ACS 328 authenticates the consumer 312 using authentication schemes provided by the issuer 308. Further, the ACS 328 may pass from the issuer 308 to the payment processor 304 the authentication outcome upon eligible requests from the merchant 316.

Payment processor computer systems 332 are associated with the payment processor 304 and serve as an interface between the MPI of the merchant computer systems 324 and the ACS of the issuer computer systems 328. According to some embodiments, the payment processor computer systems 332 manage requests from the issuer 308 and the merchant 316. For example, the payment processor computer systems 332 gather consumer enrollment data from the issuer 308, provide to the merchant 316 the alias account identifiers associated with the payment accounts of the consumer 312, instruct the ACS 328 of issuer computer systems 328 that the merchant 316 wants the issuer 308 to authenticate the consumer 312 via the consumer device 320, obtain the authentication outcome from the ACS of the issuer computer systems 328, and provide the obtained authentication outcome to the MPI of the merchant computer systems 324. The payment processor computer systems 332 also serve as a centralized location for registering and storing alias account identifiers and user identifications.

Interface 338 is provided between the consumer device 320 and the MPI of the merchant computer systems 324. When the consumer wants to purchase an item from the merchant 316, the consumer 312 can access the interface 338 via the consumer device 320 and initiate the purchase. Upon initiation, the interface 338 obtains a user identifier from the consumer 312. For example, the user identifier may be the telephone number associated with the consumer device 320. The interface 338 then presents the consumer 312 with a list of the alias account identifiers associated with the payment accounts of the consumer 312. Further, the interface 338 communicates the payment outcome after the issuer 308 has complete the authentication process. One having ordinary skill in the relevant art will understand that the interface 338 can be defined by a variety of mobile channels presented from the MPI of the merchant computer systems 324 to the consumer device 320.

Interface 342 is provided between the consumer device 320 and the ACS of the issuer computer systems 328 and is configured to provide an enrollment interface that the consumer 312 can access to enroll in the payment service. The enrollment interface of the interface 342 captures the consumer's enrollment data, such as the selected alias account identifiers and authentication channels for the consumer's payment accounts that are held at the issuer 308. The interface 342 also provides an authentication interface that the consumer 312 can access to authentication payment transactions. For example, the authentication interface of the interface 342 presents the consumer 312 with a request to authenticate a particular transaction and then captures and sends back the authentication data from the consumer device 320 to the ACS of the issuer computer systems 328. The authentication interface of the interface 342 then presents the authentication outcome to the consumer 312. One having ordinary skill in the relevant art will understand that the interface 342 can be defined by a variety of mobile channels presented from the ACS of the issuer computer systems 328 to the consumer device 320.

Interface 346 is provided between the MPI of the merchant computer systems 324 and the payment processor computer systems 332 and is configured to capture the user identifier of the consumer 312 when the consumer 312 initiates a transaction with the merchant 316, and deliver a list of alias account identifiers associated with the payment accounts of the consumer 312 whose user identifier was captured. The interface 346 also captures the alias account identifier that the consumer 312 selected for the transaction and a request from the merchant to authenticate the transaction. If the transaction is successfully authenticated, the interface 346 delivers to the merchant 316 the account details, e.g., payment account number and expiration date, for the payment account that was selected by the consumer 312. According to some embodiments, the interface 346 is implemented using an authentication protocol that provides an added layer of security by requiring that the issuer 308 authenticate the consumer 312 before the transaction between the merchant 316 and the consumer 308 can be successfully authenticated. However, one having ordinary skill in the relevant art will understand that the interface 346 can be defined by a variety of authentication protocols.

Interface 350 is provided between the ACS of the issuer computer systems 328 and the payment processor computer systems 332 and is configured to inform the ACS of the issuer computer systems 328 when the MPI of the merchant computers systems 324 desires that the ACS 328 authenticate the consumer 312. Further, upon authentication of the consumer 312, the interface 350 requests from the ACS of the issuer computer systems 328 account details, e.g., payment account number and expiration date, of the payment account that was selected by the consumer 312, so that the payment processor computer systems 332 can provide that information to the MPI of the merchant computer systems 324. According to some embodiments, the interface 350 is implemented using an authentication protocol that requires the ACS of the issuer computer systems 328 authenticate the consumer 312 before the transaction between the merchant 316 and the consumer 308 can be successfully authenticated. However, it should be appreciated that the interface 346 can be defined by a variety of authentication protocols, including protocols that do not require that the issuer 308 authenticate the consumer 312.

Figure 4A:
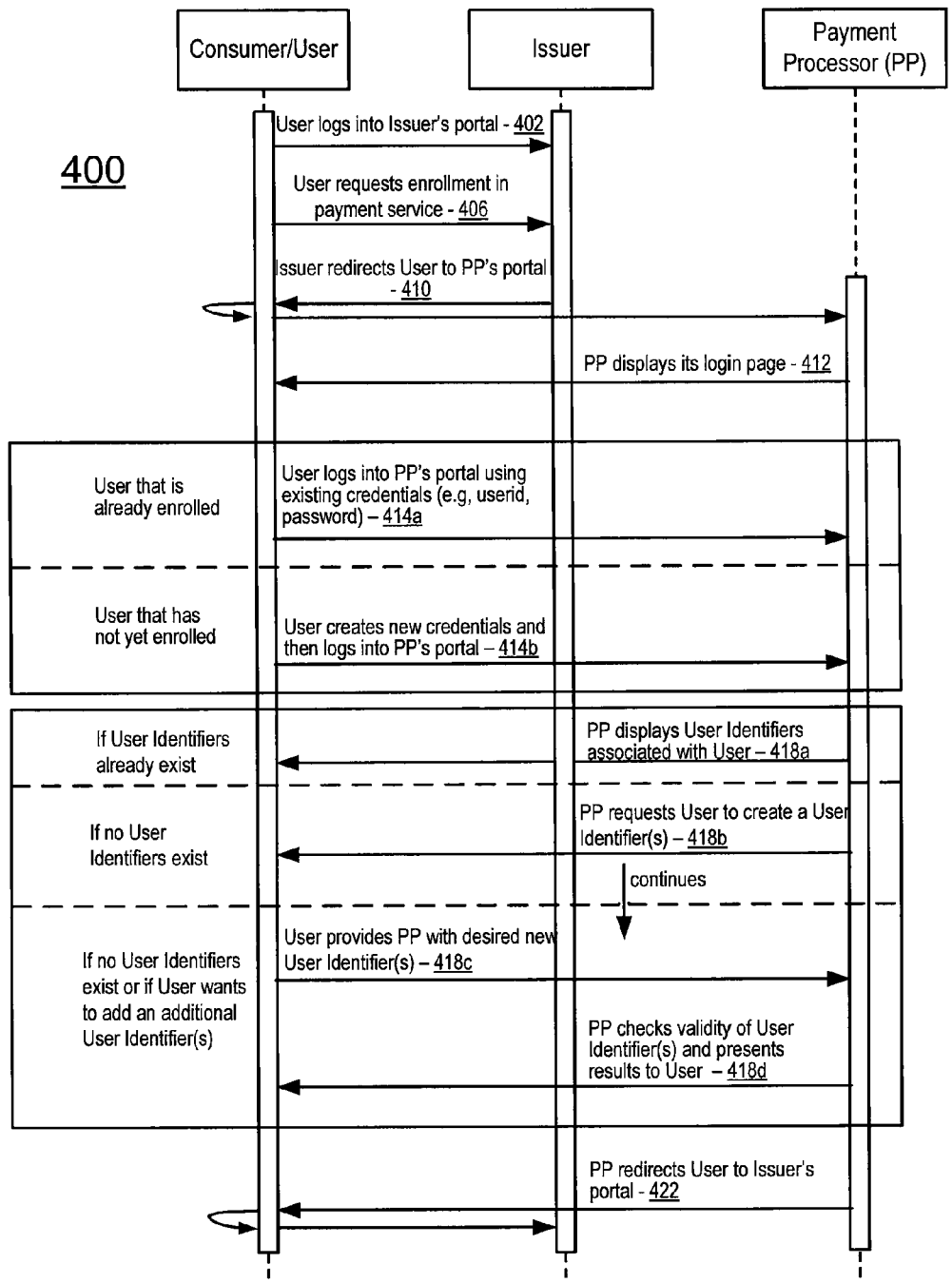
FIGS. 4a and 4b show a flowchart illustrating aspects of an exemplary enrollment process, in accordance with at least one embodiment.
Figure 4B:
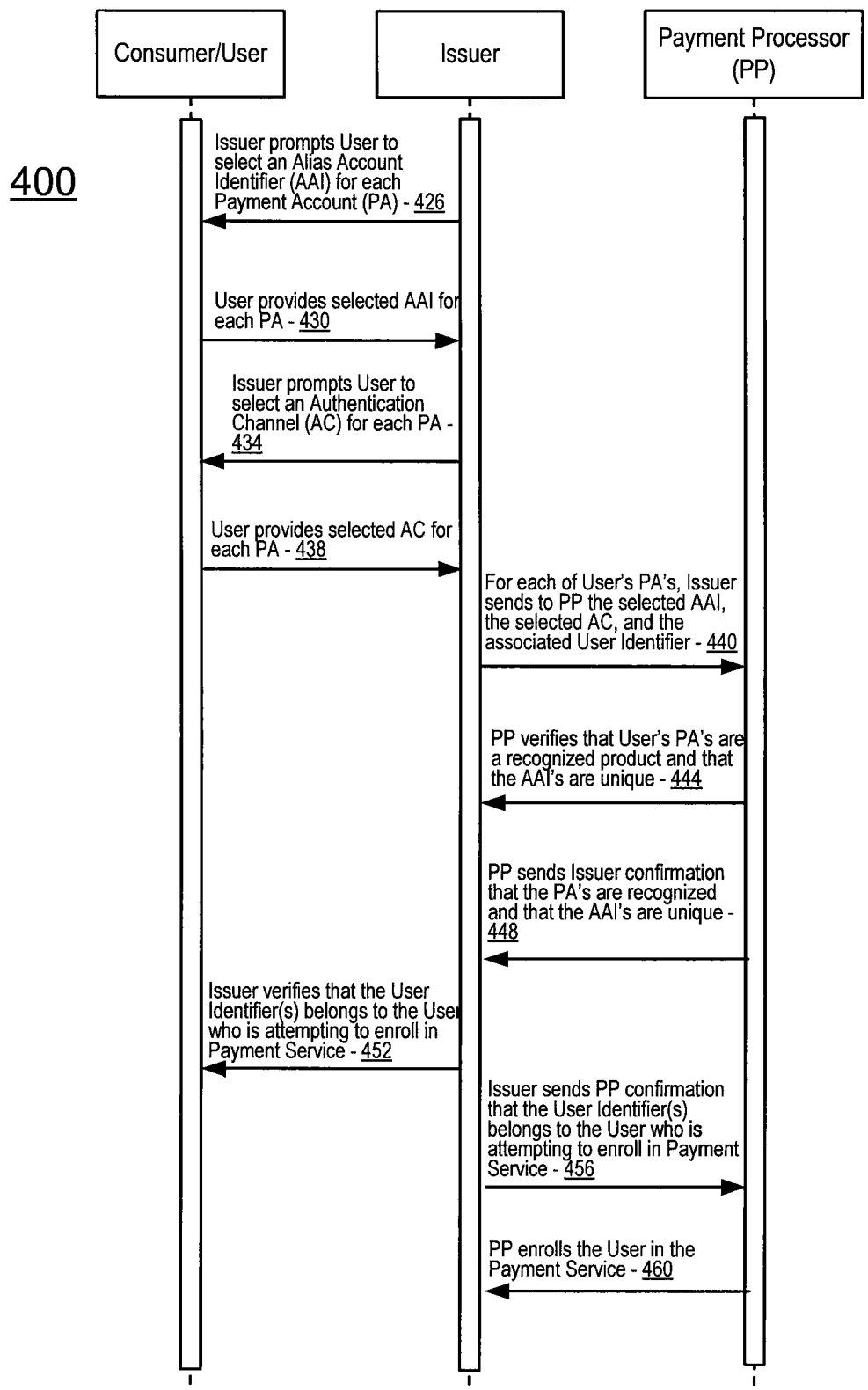

Referring now to FIGS. 3 and 4a-b, an exemplary enrollment process 400 is provided for enrolling a consumer 312 in a payment service that enables the consumer to conduct payment transactions with a merchant 316 more efficiently in situations where the consumer has multiple payment accounts. As indicated at step 402, the process 400 generally begins with the consumer 312 logging into a portal provided by the issuer 308 and then, as indicated at step 406, requesting to be enrolled in the payment service. Next, as indicated at step 410, the issuer 308 redirects the consumer 312 to a portal provided by the payment processor 304, which, as indicated at step 412, displays a login page. If the consumer 312 has previously registered at the payment processor's portal, the consumer 312 logs into the portal using existing credentials (e.g., user name and password), as indicated at step 414a. However, if the consumer 312 has not previously registered, the consumer 312 creates new credentials and then logs into the portal using the newly created credentials, as indicated at step 414b.

After the consumer 312 has logged into the portal of payment processor 304, the payment processor 304, as indicated at step 418a, displays to the consumer 312 all of the user identifiers across all issuers that are associated with the consumer 312 and that are stored in a consumer database by or on behalf of the payment processor 304. For example, the user identifier may be the consumer's telephone number, MSISDN, or any other number or code that is unique to the consumer 312 across issuers. If the payment processor 304 is unable to locate any user identifiers associated with the consumer 312, then the payment processor 304, as indicated at step 418*b*, prompts the consumer 312 to a create user identifier. The consumer 312, as indicated at step 418*c*, provides the payment processor 304 with a desired user identifier and then, as indicated at step 418*d*, the payment processor 304 validates the desired user identifier by determining whether any other consumers have registered the desired user identifier. For example, the desired user identifier is valid, if the it is not associated or has not been registered with another consumer and if it complies with all formatting requirements. If the desired user identifier is valid, then the payment processor 304, as indicated at step 422, redirects the consumer 312 to the portal of the issuer 308, where the issuer 308, as indicated at step 426, prompts the consumer 312 to assign an alias account identifier or nickname to each of the payment accounts that the issuer 308 holds or manages for the consumer 312.

Next, as indicated at step 430, the consumer 312 provides the issuer 308 alias account identifiers for the consumer's payment accounts. Then, as indicated at step 434, the issuer 308 prompts the consumer 312 to select an authentication channel. In some embodiments, the consumer 312 can select an authentication channel per payment account, whereas in other embodiments, the consumer 312 can only select an authentication channel for all payment accounts held at the issuer 308. Authentication channels for example may be web, mobile web, IVR, CSR, SMS, and/or USSD-2. As indicated in step 438, the consumer 312 provides the issuer 308 the authentication channel selection.

As indicated at step 440, for each payment account that belongs to the consumer 312, the issuer 308 provides the payment processor 304 the selected alias account identifier and authentication channel. According to some embodiments, the issuer 308 includes the user identifier of the consumer 312 when providing the selected alias account identifiers and authentication channels. The payment processor 304 associates the user identifier with the payment accounts of the consumer 312. If the consumer has multiple user identifiers, then the consumer 312 specifies which payment accounts should be associated with which user identifiers. According to some embodiments, multiple payment accounts may be associated with a single user identifier, but only one user identifier can be associated with a payment account.

Next, as indicated at step 444, the payment processor 304 verifies that the consumer's payment accounts are a recognized product, e.g., a type of payment account, e.g, credit-card account, that the payment processor 304 processes, and that the selected alias account identifiers are unique. For example, when verifying that a selected alias account identifier is unique, the payment processor 304 makes sure that the consumer 312 does not have other payment accounts, such as payment accounts held at other issuers, that have the same alias account identifier. If the payment accounts are recognized and if the alias account identifiers are unique, then the payment processor 304, as indicated at step 448, sends the issuer 308 confirmation of such. Next, as indicated at step 452, the issuer 308 verifies that the user identifier or the user identifiers used in the enrollment process actually belong to the consumer 312 who is attempting to enroll in the payment service.

Figure 5:
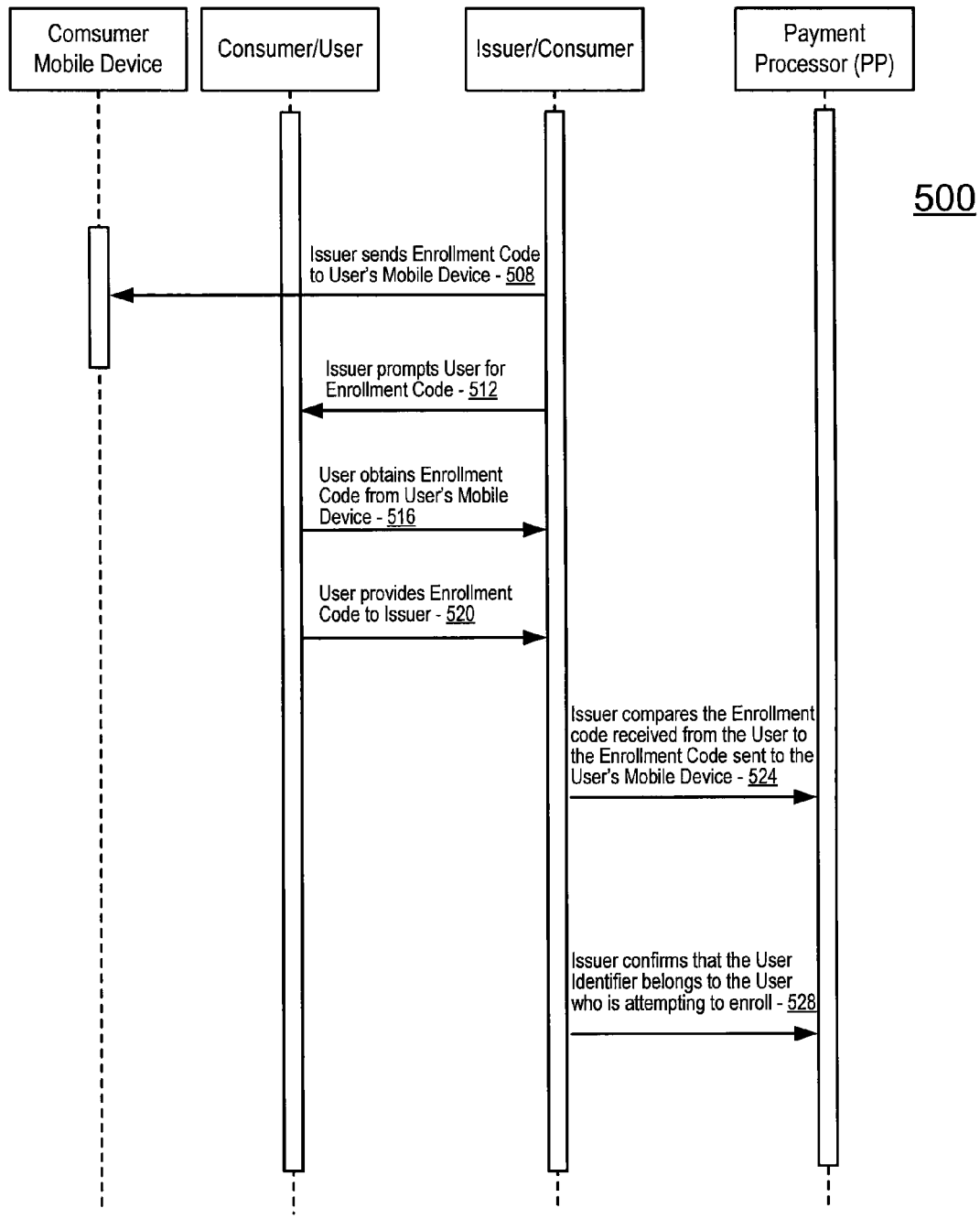
FIG. 5 shows a flowchart illustrating aspects of an exemplary process for confirming whether a user identifier belongs to the consumer attempting to enroll in a payment service, in accordance with at least one embodiment.

With reference to FIG. 5, an exemplary process 500 is provided for verifying that the user identifier, e.g., the phone number of the consumer device 320, used in the enrollment process actually belongs to the consumer 312 who is attempting to enroll in the payment service. As indicated at step 508, the issuer 308 sends an enrollment code to the phone number, e.g., the user identifier, of the consumer device 320. Then, as indicated at step 512, the issuer 308 prompts the consumer 312 to enter the enrollment code in issuer's portal. Next, as indicated at step 516, the consumer 312 obtains the enrollment code from the consumer device 320 and then, as indicated at step 520 the consumer 312 provides the enrollment code to the issuer 308 via the portal. As indicated in step 524, the issuer 308 compares the enrollment code received from the consumer 312 to the enrollment code that the issuer 308 send to the consumer device 320. Then, as indicated at step 528, if the enrollment code received from the consumer 312 matches the enrollment code sent to the consumer device 320, then the issuer 308 confirms that the user identifier, which is associated with the consumer device 320, belongs to the consumer 312 who is accessing the portal of the issuer 308 and attempting to enroll the user identifier in the payment service.

Referring again to FIGS. 4*a-b*, after verifying that the user identifier being enrolled actually belongs to the consumer 312 attempting to enroll in the payment service via the portal of the issuer 308, the issuer 308 sends the payment processor 304 confirmation of such, as indicated at step 456. Upon receiving this confirmation, the payment processor 304, according to step 460, enrolls the consumer 312 in the payment service.

Figure 6:
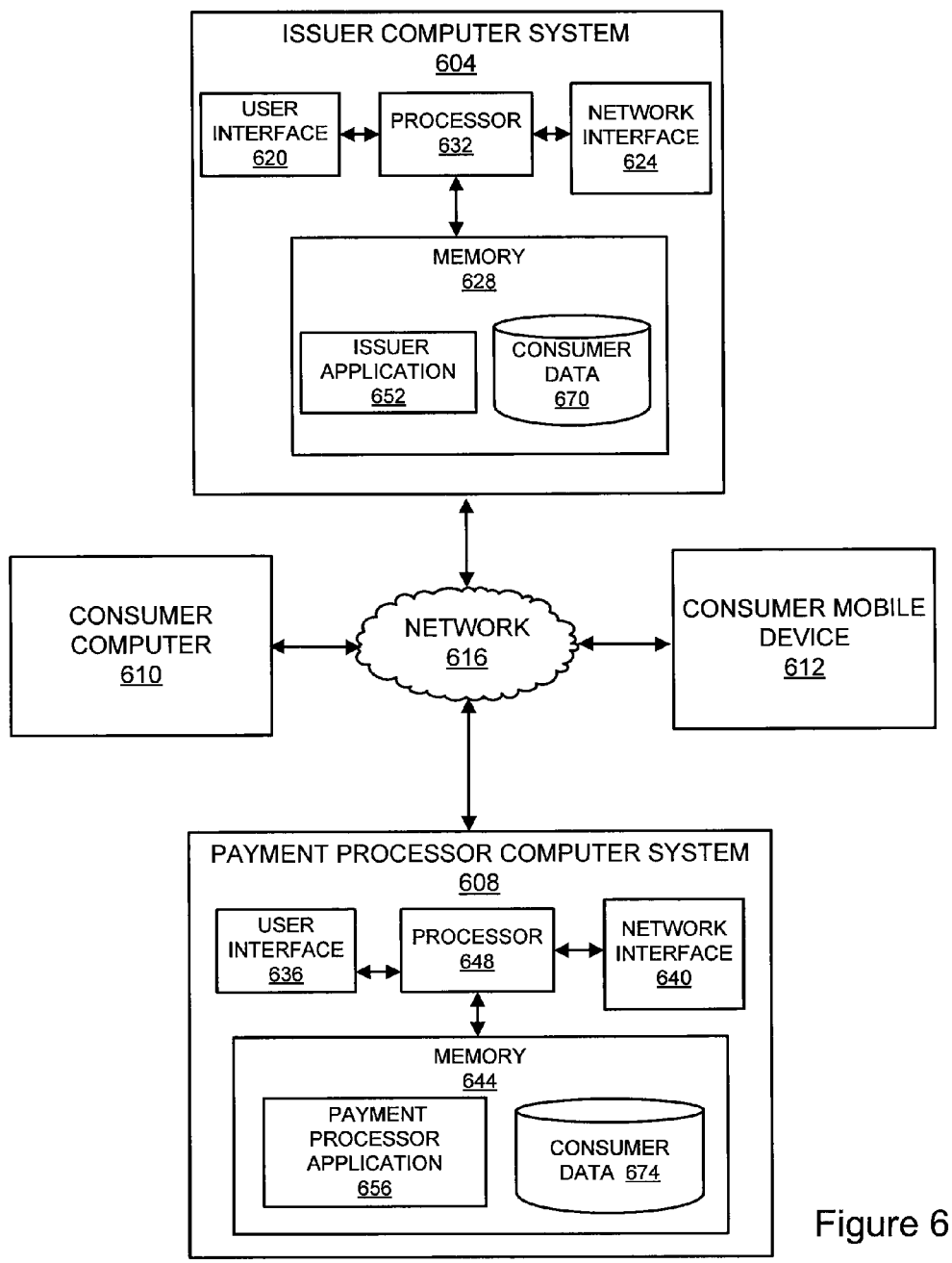
FIG. 6 shows a block diagram illustrating aspects of an exemplary system, in accordance with at least one embodiment.

FIG. 6 provides a block diagram of a consumer enrollment environment 600, in accordance with one embodiment of the present invention. The consumer enrollment environment 600 generally includes an issuer computer system 604, a payment processor computer system 608, a consumer computer 610, and a consumer mobile device 612 in communication via a network 616. The consumer computer 610 may be a personal computer or a laptop. The consumer computer 610 may run an operating system such as Microsoft Windows™ and may have a suitable browser such as Internet Explorer™. The consumer mobile device 612 may be a mobile phone similar to the one described in FIG. 10. The issuer computer system 604 comprises a user interface apparatus 620, a network interface apparatus 624, and a memory apparatus 628 operatively coupled to a processing apparatus 632. Similarly, the payment processor computer system 608 comprises a user interface apparatus 636, a network interface apparatus 640, and a memory apparatus 644 operatively coupled to a processing apparatus 648.

As used herein, the term apparatus refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It should be understood by one of ordinary skill in the art in view of this disclosure that, although FIG. 6 illustrates the user interface, network interface, memory apparatus, and processing apparatus of the issuer and payment processor computer systems 604, 608 as separate blocks in the block diagram, these separations may be merely conceptual. In other words, in some instances, the user interface, for example, is a separate and distinct device from the processing apparatus and the memory apparatus and therefore may have its own processor, memory, and software. In other instances, however, the user interface is directly coupled to or integral with at least one part of the processing apparatus and at least one part of the memory apparatus and includes the user interface input and output hardware used by the processing apparatus when the processing apparatus executes user input and output software stored in the memory apparatus.

The user interfaces 620, 636 respectively include hardware and/or software for receiving input into the issuer and payment processor computer systems 604, 608 from a user and hardware and/or software for communicating output from the issuer and payment processor computer systems 604, 608 to a user. In some embodiments, the user interfaces 620, 636 respectively include one or more user input devices, such as a keyboard, keypad, mouse, microphone, touch screen, touch pad, controller, and/or the like. In some embodiments, the user interfaces 620, 636 respectively include one or more user output devices, such as a display (e.g., a monitor, liquid crystal display, one or more light emitting diodes, etc.), a speaker, a tactile output device, a printer, and/or other sensory devices that can be used to communicate information to a person. In one embodiment, the user interfaces 620, 636 respectively include a user terminal, which terminal may be used by an employee of the issuer and/or payment processor.

In some embodiments, the network interfaces 624, 640 are respectively configured to receive electronic input from other devices in the network 616, including each other and the consumer mobile device 612 and the consumer computer 610. In some embodiments, the network interfaces 624, 640 are respectively configured to send electronic output to other devices in a network. The network 616 may include a direct connection between a plurality of devices, a global area network such as the Internet, a wide area network such as an intranet, a local area network, a wireline network, a wireless network, a virtual private network, other types of networks, and/or a combination of the foregoing.

The processing apparatuses 632, 648 respectively include circuitry used for implementing communication and logic functions of the issuer and payment processor computer systems 604, 608. For example, the processing apparatuses 632, 648 may respectively include a digital signal processor device, a microprocessor device, and various analog-to-digital converters, digital-to-analog converters, and other support circuits. Control and signal processing functions of the issuer and payment processor computer systems 604, 608 are allocated between these devices according to their respective capabilities. The processing apparatuses 632, 648 may respectively include functionality to operate one or more software programs based on computer-readable instructions thereof, which may be stored in the memory apparatuses 628, 644. As described in greater detail below, in one embodiment of the invention, the memory apparatus 628 of the issuer computer system 604 includes an issuer application 652 stored therein for instructing the processing apparatus 632 to perform one or more operations of the procedures described herein and in reference to FIG. 7, for example. Further, as described in greater detail below, in one embodiment of the invention, the memory apparatus 644 includes a payment processor application 656 stored therein for instructing the processing apparatus 648 of the payment processor computer system 608 to perform one or more operations of the procedures described herein and in reference to FIG. 8, for example. Some embodiments of the invention may include other applications stored in the memory apparatuses 628, 644. It should be appreciated that the consumer enrollment environment 600 can be configured to execute all of the processes described here including those described with reference to FIGS. 2-5 and 7-8.

In general, the memory apparatuses 628, 644 are respectively communicatively coupled to the processing apparatuses 632, 648 and respectively include computer-readable storage medium for storing computer-readable program code and instructions, as well as datastores containing data and/or databases. More particularly, the memory apparatuses 628, 644 may respectively include volatile memory, such as volatile Random Access Memory (RAM) including a cache area for the temporary storage of data. The memory apparatuses 628, 644 may also respectively include non-volatile memory that can be embedded and/or may be removable. The non-volatile memory can, for example, comprise an EEPROM, flash memory, or the like. The memory apparatuses 628, 644 can store any of a number of pieces of information and data used by the issuer and payment processor computer systems 604, 608 to implement the respective functions of the issuer and payment processor computer systems 604, 608 described herein.

In the illustrated embodiment, the memory apparatus 628 of the issuer computer system 604 includes a datastore containing consumer data 670. According to some embodiments, the consumer data 670 generally includes information (e.g., payment account data, demographic data, etc) about each consumer who holds a payment account at the issuer that owns or operates the issuer computer system 604. Also, in the illustrated embodiment, the memory apparatus 644 of the payment processor computer system 608 includes a datastore containing consumer data 674. According to some embodiments, the consumer data 670 generally includes information (e.g., payment account data, demographic data, user identifiers, alias account identifiers, authentication channels, etc) for each consumer who holds a payment account at any issuer or other entity that uses the payment processor to process payment transactions.

Figure 7:
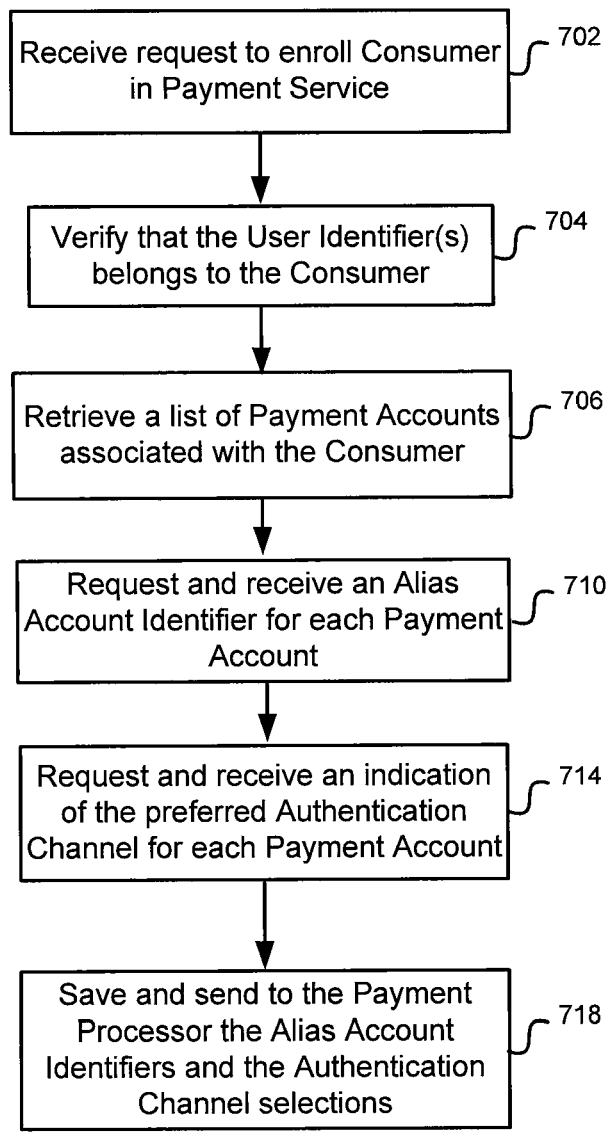
FIG. 7 shows a flowchart illustrating aspects of an exemplary enrollment process from the perspective of an issuer, in accordance with at least one embodiment.

FIG. 7 provides a flow diagram illustrating an exemplary enrollment process 700 whereby the issuer 308 facilitates enrollment of the consumer 312 in the payment service, in accordance with one embodiment of the present invention. The enrollment process 700 of FIG. 7 is presented from the perspective of the issuer 308 and is described as being implemented in the issuer computer system 604. As indicated at step 602, the process 600 generally begins with the issuer 308 receiving a request from the consumer 312 to enroll the consumer 312 in the payment service. For example, the issuer computer system 604 may receive the request via the network interface 624 from the consumer computer 610 or the mobile consumer device 612. Also, for example, the consumer 312 or an employee or agent of the issuer 308 acting on behalf consumer 312 may access the issuer computer system 604 via the user interface 620 and request that the issuer 308 enroll the consumer 312 in the payment service. According to some embodiments, after receiving the enrollment request, the issuer application 652 instructs the processor 632 to redirect the consumer 312 to the payment processor computer system 608, which creates or verifies credentials that enable the consumer 312 to access a portal provided by the payment processor computer system 608. Further, according to some embodiments, the payment processor computer system 608 creates or verifies at least a user identifier, e.g., the telephone number of the mobile consumer device 612, for the consumer 312. As described below, each user identifier is unique to the consumer 312 across all issuers. After creating or verifying the consumer's login credentials and user identifier, the payment processing computer system 608 redirects the consumer 312, along with the user identifier associated with the consumer 312, to the issuer computer system 604.

Next, as indicated at step 704, the issuer application 652 of issuer computer system 604 instructs the processor 632 to verify that the user identifier provided from the payment processor is associated with the consumer mobile device 612 of the consumer 308 who is attempting to enroll in the payment service. Then, as indicated at step 706, the issuer application 652 instructs the processor 632 to access the consumer data 670 and retrieve a list of payment accounts that are associated with the consumer 312. Next, as indicated at step 710, the issuer application 652 instructs the processor 632 to present the list of payment accounts to the consumer 312 via the consumer computer 610 or the mobile consumer device 612, request that the consumer 312 provide an alias account identifier, e.g., a nickname, for each payment account, and receive the selected alias account identifiers from the consumer 312. As indicated at step 714, the issuer application 652 then instructs the processor 632 to request that the consumer 312 select an authentication channel for each payment account, and receive the selected authentication channels from the consumer 312.

Next, as indicated at step 718, the issuer application 652 instructs the processor 632 to save in the consumer data 670, for each of the consumer's payment accounts, the selected alias account identifier, authorization channel selection, and the associated user identifier. Further, as indicated at step 718, the issuer application 652 instructs the processor 632 to send to the payment processor computer system 608 the selected alias account identifier, authorization channel selection, and the associated user identifier for each of the consumer's payment accounts.

Figure 8:
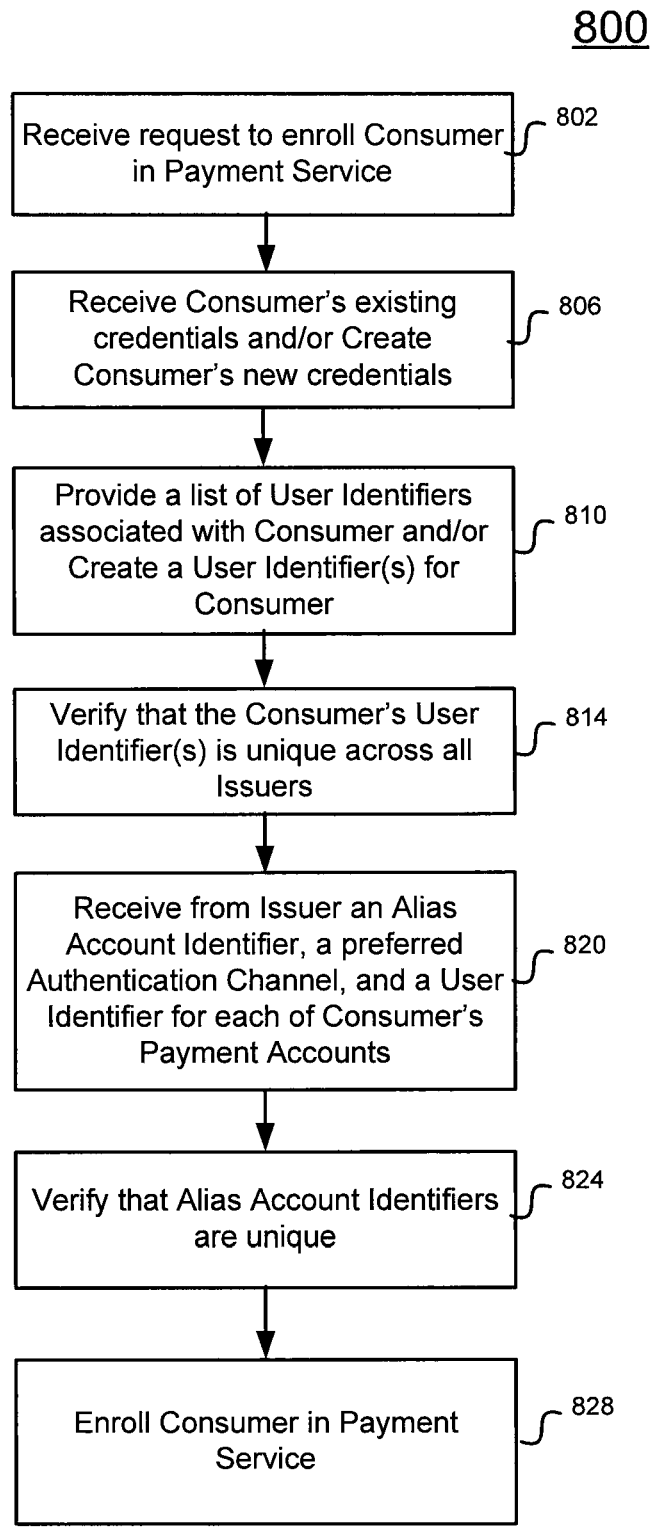
FIG. 8 shows a flowchart illustrating aspects of an exemplary enrollment process from the perspective of an payment processor, in accordance with at least one embodiment.

FIG. 8 provides a flow diagram illustrating an exemplary enrollment process 800 whereby the payment processor 304 enrolls the consumer 312 in the payment service, in accordance with one embodiment of the present invention. The enrollment process 800 of FIG. 8 is presented from the perspective of the payment processor 304 and is described as being implemented in the payment processor computer system 608. As indicated at step 802, the process 800 generally begins with the payment processor 304 receiving a request to enroll the consumer 312 in the payment service. For example, the payment processor computer system 608 may receive the request via a redirect from the issuer computer system 604. Also, for example, the consumer 312 or an employee or agent of the payment processor 304 acting on behalf of the consumer 312 may access the payment processor computer system 608 via the user interface 636 and request enrollment of the consumer 312.

After receiving the request to enroll the consumer 312, the payment processor application 656 instructs the processor 648 to present the consumer 312 with a login page to a portal supported by the payment processor computer system 608. As such, as indicated at step 806, the payment processor computer system 608 receives the consumer's login credentials. If the consumer 312 does not already have credentials, the payment processor application 656 instructs the processor 648 to enable the consumer 312 to create new credentials. Next, if the consumer 312 already had credentials, the payment processor application 656, as indicated at step 810, instructs the processor 648 to access the consumer data 674 and identify all user identifiers associated with the consumer. If the consumer 312 did not already have credentials and had to create new credential, then the payment processor application 656, as indicated at step 810, instructs the processor 648 to prompt the consumer 312 to create a new user identifier and then store the newly created user identifier in the consumer data 674.

Next, as indicated at step 814, the payment processor computer system 608 verifies that the user identifier, e.g., telephone number of the consumer mobile device 612 associated with the consumer 312 is unique across all issuers 308. For example, the payment processor application 656 instructions the processor 648 to access the consumer data 674, which includes consumer data across multiple issuers, to make sure that no other consumers 312 that are associated with other issuers have the same user identifier. Then, as indicated at step 820, the payment processor computer system 608 receives from the issuer computer system 604 an alias account identifier and an authentication channel selection for each of the consumer's payment accounts. Also, as indicated in step 820, the payment processor computer system 608 receives from the issuer computer system 604 the user identifier that the consumer 312 selected for being associated with the payment account.

As indicated at step 824, the payment processor application 656 instructions the processor 648 to verify that the selected alias account identifiers are unique. To do, for example, the payment processor application 656 instruction the processor 648 to access the consumer data 674 to make sure that the consumer 312 has not already assigned the alias account identifier to another account that is associated with the consumer across all issuers. If the alias account identifiers are unique, then the payment processor application 656 instructions the processor 648 to enroll the consumer in the payment service, as indicated at step 828.

Figure 9:
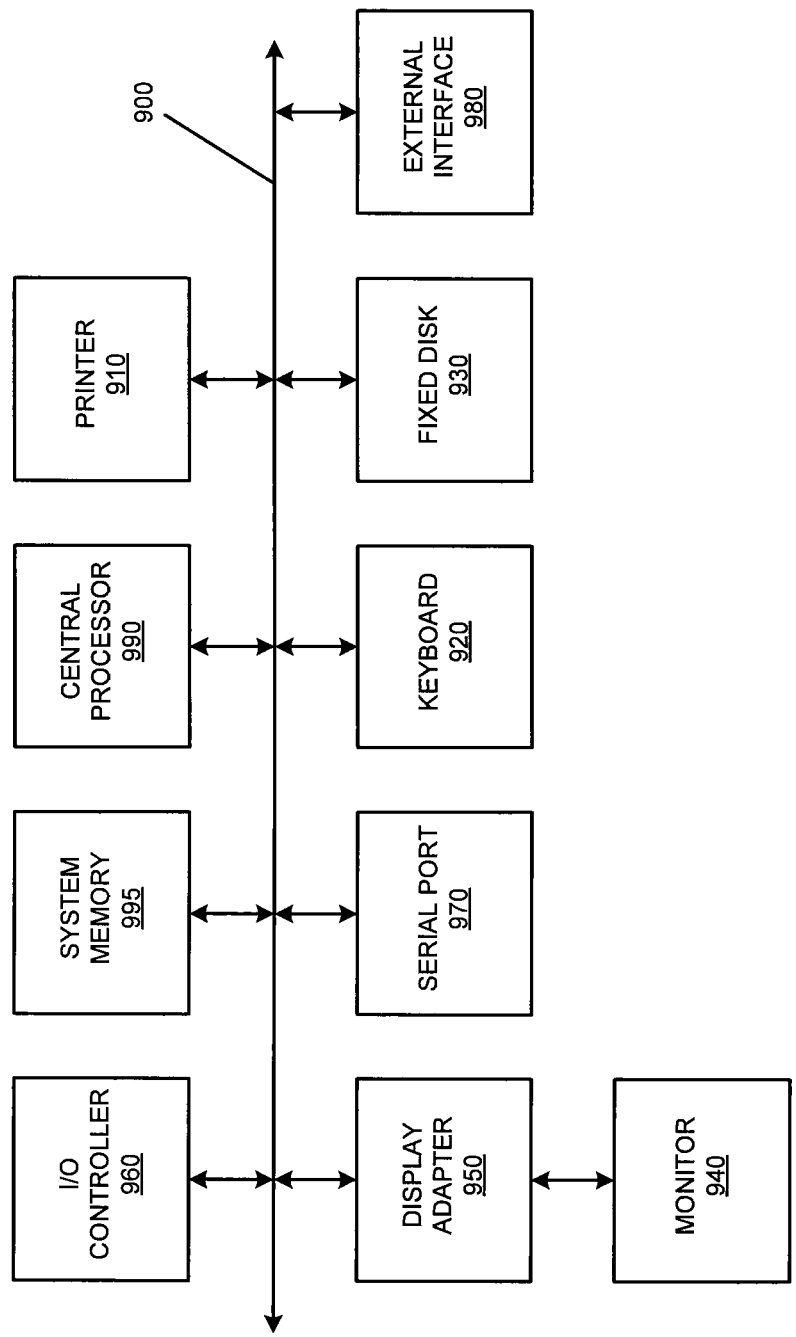
FIG. 9 shows a block diagram illustrating aspects of an exemplary computer apparatus, in accordance with at least one embodiment.

The various participants and elements in the previously described system diagrams (e.g., the computers, issuers, servers, etc. in FIGS. 1-8) may use any suitable number of subsystems to facilitate the functions described herein. Examples of such subsystems or components are shown in FIG. 9. The subsystems shown in FIG. 9 are interconnected via a system bus 900. Additional subsystems such as a printer 910, keyboard 920, fixed disk 930 (or other memory comprising computer-readable media), monitor 940, which is coupled to display adapter 950, and others are shown. Peripherals and input/output (I/O) devices, which couple to I/O controller 960, can be connected to the computer system by any number of means known in the art, such as serial port 970. For example, serial port 970 or external interface 980 can be used to connect the computer apparatus to a wide area network such as the Internet, a mouse input device, or a scanner. The interconnection via system bus allows the central processor 990 to communicate with each subsystem and to control the execution of instructions from system memory 995 or the fixed disk 930, as well as the exchange of information between subsystems. The system memory 995 and/or the fixed disk 930 may embody a computer-readable medium.

Figure 10:
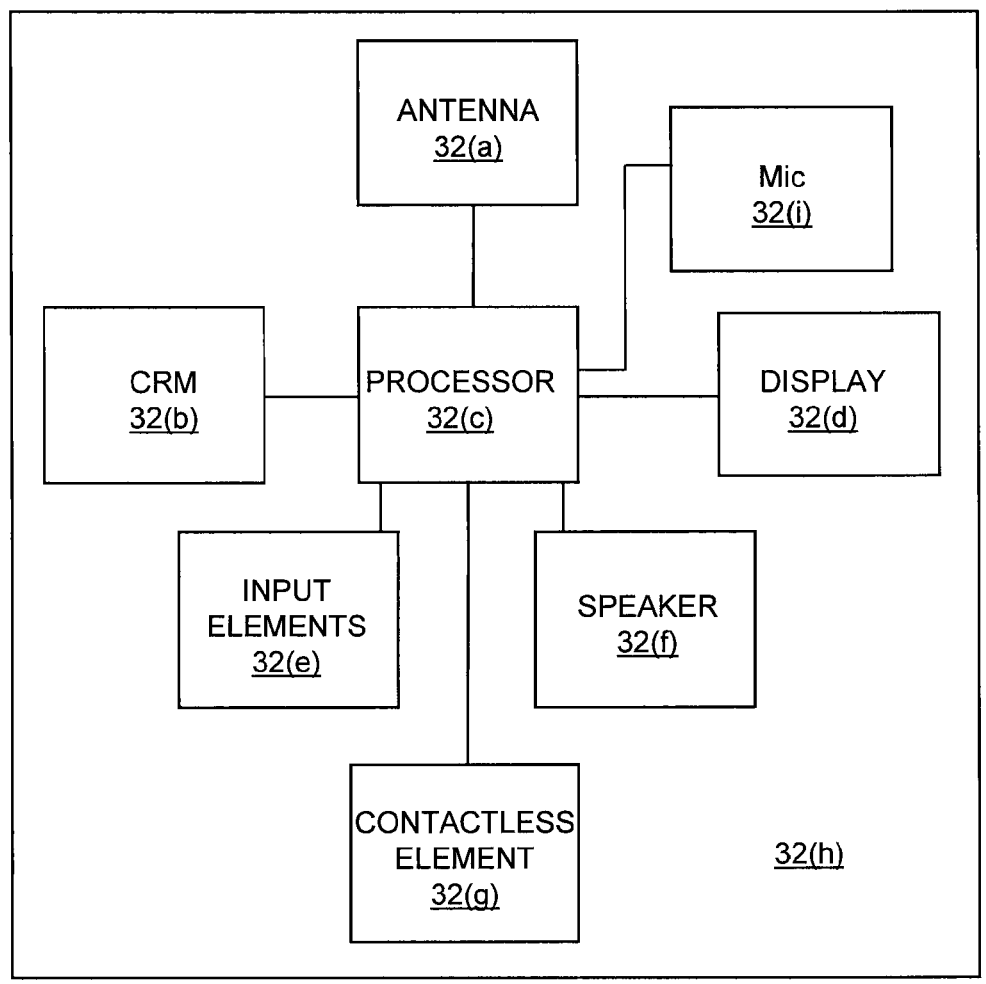
FIG. 10 shows a block diagram illustrating aspects of an exemplary mobile device, in accordance with at least one embodiment.

FIG. 10 shows block diagram of the exemplary consumer mobile device 32 of FIG. 1. FIG. 10 shows a number of components, and the various mobile devices described herein, such the consumer device 320 of FIG. 3, and the consumer mobile device 612 of FIG. 6, may comprise any suitable combination or subset of such components. The exemplary consumer mobile device 32 in the form of a mobile device may comprise a computer readable medium and a body as shown in FIG. 10. The computer readable medium 32(b) may be present within the body 32(h), or may be detachable from it. The body 32(h) may be in the form a plastic substrate, housing, or other structure. The computer readable medium 32(b) may be a memory, such as a tangible (i.e. physical or durable) memory that stores data and may be in any suitable form including a hard drive, magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as payment account information, bank identification number (BIN), credit or debit card number information, account balance information, expiration date, consumer information such as name, date of birth, etc. Any of this information may be transmitted by the consumer mobile device 32.

The mobile device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) consumer mobile device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the consumer mobile device 32 and an interrogation device. Thus, the consumer mobile device 32 is capable of communicating and transferring data and/or control instructions via both cellular network and near field communications capability.

The consumer mobile device 32 may also include a processor 32(c) (e.g., a microprocessor or a group of processors working together) for processing the functions of the consumer mobile device 32 and a display 32(d) to allow a consumer to see phone numbers and other information and messages. The consumer mobile device 32 may further include input elements 32(e) to allow a consumer to input information into the device, a speaker 32(f) to allow the consumer to hear voice communication, music, etc., and a microphone 32(i) to allow the consumer to transmit her voice through the consumer mobile device 32. The consumer mobile device 32 may also include an antenna 32(a) for wireless data transfer (e.g., data transmission).

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art. For example, although the specific embodiments of the invention refer to payment transactions, it is also possible for embodiments of the invention to be used in non-payment transactions such as money transfer transactions.

As used herein, the use of "a", "an" or "the" is intended to mean "at least one", unless specifically indicated to the contrary.

What is claimed is:

1. A method of enrolling a user in a payment service, comprising:
   receiving, by a server computer from a consumer device of the user, a request to enroll the user in the payment service, wherein the request includes a user identifier associated with the user;
   verifying, by the server computer, that the user identifier is unique to the user across a plurality of account issuers, by:
      accessing a consumer database having a plurality of user identifiers provided by the account issuers; and
      reviewing the user identifiers in the consumer database to ensure that the user identifier associated with the user is not associated with another user;
   if the user identifier is verified as being unique, redirecting, by the server computer, the consumer device of the user to an interface of an account issuer computer system of at least one of the account issuers that; holds a payment account that is associated with the user, wherein the account issuer computer system uses the user identifier associated with the user to identify a payment account associated with the user and enables the user to use the consumer device to assign an alias account identifier to the payment accounts;
   receiving, by the server computer, from the account issuer computer system of the at least one of the account issuers data that identifies a payment account and an alias account identifier that the user assigned to the payment account; and
   storing, by the server computer, in the consumer database the alias account identifier that the user assigned to the payment account.

2. The method of claim 1, further comprising:
   receiving, by the server computer, from the at least one of the account issuers a verification that the user identifier is associated with the user requesting enrollment in the payment service.

3. The method of claim 2, wherein the user identifier is a mobile telephone number that is associated with the user requesting enrollment in the payment service.

4. The method of claim 3, wherein the at least one of the account issuers verifies that the mobile telephone number is associated with the user requesting enrollment in the payment service, by:
   sending an enrollment code, via a network, to a mobile device associated with the mobile telephone number; and
   requesting that the user requesting enrollment in the payment service input the enrollment code into a webpage associated with the at least one account issuer.

5. The method of claim 1, wherein the at least one of the account issuers enables the user to access the account issuer computer system using the consumer device to select an authentication channel for authenticating the payment account.

6. The method of claim 5, further comprising:
receiving, by the server computer, from the at least one of the account issuers the authentication channel that was selected by the user to use for authenticating the payment account.

7. The method of claim 6, wherein the authentication channel is selected from a group consisting of interactive voice response, web, mobile web, and mobile application.

8. The method of claim 1, further comprising:
verifying, by the server computer, that the alias account identifier that the user assigned to the payment account is unique relative to one or more other aliases assigned to one or more other payment accounts associated with the user.

9. The method of claim 1, further comprising:
sending, by the server computer, to the at least one account issuer a confirmation that the user has been enrolled in the payment service.

10. A non-transitory computer readable medium comprising computer readable program code embodied therein, the computer readable program code adapted to be executed by a processor to implement a method of enrolling a user in a payment service, the method comprising the steps of:
receiving, from a consumer device of the user, a request to enroll the user in the payment service, wherein the request includes a user identifier associated with the user;
verifying that the user identifier is unique to the user across a plurality of account issuers, by:
accessing a customer database having a plurality of user identifiers provided by the account issuers; and
reviewing the user identifiers in the consumer database to ensure that the user identifier associated with the user is not associated with another user;
if the user identifier is verified as being unique, redirecting the consumer device of the user to an interface of an account issuer computer system of at least one of the account issuers that holds a payment account that is associated with the user, wherein the account issuer computer system uses the user identifier associated with the user to identify a payment account associated with the user and enables the user to use the consumer device to assign an alias account identifier to the payment account;
receiving from the account issuer computer system of the at least one of the account issuers data that identifies a payment account and an alias account identifier that the user assigned to the payment account; and
storing in the consumer database the alias account identifier that the user assigned to the payment account.

11. The computer readable medium of claim 10 wherein the computer readable program code is further adapted to be executed by the processor to implement the step of:
receiving from the at least one of the account issuers a verification that the user identifier is associated with the user requesting enrollment in the payment service.

12. The computer readable medium of claim 11, wherein the user identifier is a mobile telephone number that is associated with the user requesting enrollment in the payment service.

13. The computer readable medium of claim 12, wherein the at least one of the account issuers verifies that the mobile telephone number is associated with the user requesting enrollment in the payment service, by:

sending an enrollment code, via a network, to a mobile device associated with the mobile telephone number; and
requesting that the user requesting enrollment in the payment service input the enrollment code into a webpage associated with the at least one account issuer.

14. The method of claim 10, wherein the at least one of the account issuers enables the user to access the account issuer computer system using the consumer device to select an authentication channel for authenticating the payment account.

15. The method of claim 14, further comprising:
receiving, by the server computer, from the at least one of the account issuers the authentication channel that was selected by the user to use for authenticating the payment account.

16. A server computer comprising:
a processor, and a non-transitory computer readable medium coupled to the processor, the non-transitory computer readable medium comprising code, executable by the processor for performing a method of enrolling a user in a payment service, the method comprising:
receiving, from a consumer device of the user, a request to enroll the user in the payment service, wherein the request includes a user identifier associated with the user;
verifying that the user identifier is unique to the user across a plurality of account issuers, by:
accessing a customer database having a plurality of user identifiers provided by the account issuers; and
reviewing the user identifiers in the consumer database to ensure that the user identifier associated with the user is not associated with another user;
if the user identifier is verified as being unique, redirecting the consumer device of the user to an interface of an account issuer computer system of at least one of the account issuers that holds a payment account that is associated with the user, wherein the account issuer computer system uses the user identifier associated with the user to identify a payment account associated with the user and enables the user to use the consumer device to assign an alias account identifier to the payment account;
receiving from the account issuer computer system of the at least one of the account issuers data that identifies a payment account and an alias account identifier that the user assigned to the payment account; and
storing in the consumer database the alias account identifier that the user assigned to the payment account.

17. The system of claim 16 wherein method further comprises:
receiving from the at least one of the account issuers a verification that the user identifier is associated with the user requesting enrollment in the payment service.

18. The system of claim 17, wherein the user identifier is a mobile telephone number that is associated with the user requesting enrollment in the payment service.

19. The system of claim 18, wherein the at least one of the account issuers verifies that the mobile telephone number is associated with the user requesting enrollment in the payment service, by:
sending an enrollment code, via a network, to a mobile device associated with the mobile telephone number; and
requesting that the user requesting enrollment in the payment service input the enrollment code into a webpage associated with the at least one account issuer.

20. The method of claim 16, wherein the at least one of the account issuers enables the user to access the account issuer computer system using the consumer device to select an authentication channel for authenticating the payment account.

* * * * *